United States Patent
Mortensen et al.

(10) Patent No.: US 10,831,506 B2
(45) Date of Patent: Nov. 10, 2020

(54) LOCAL OVERSIGHT AND PROVISIONING OF BIOS ACTIVITY

(71) Applicant: Phoenix Technologies Ltd., Campbell, CA (US)

(72) Inventors: James L. Mortensen, Lynnwood, WA (US); Kenneth C. Taylor, Kirkland, WA (US)

(73) Assignee: Phoenix Technologies Ltd., Beaverton, OR (US)

( * ) Notice: Subject to any disclaimer, the term of this patent is extended or adjusted under 35 U.S.C. 154(b) by 219 days.

(21) Appl. No.: 15/946,219

(22) Filed: Apr. 5, 2018

(65) Prior Publication Data

US 2019/0310862 A1 Oct. 10, 2019

(51) Int. Cl.
| | | |
|---|---|---|
| *G06F 11/00* | (2006.01) | |
| *G06F 9/4401* | (2018.01) | |
| *G06F 9/50* | (2006.01) | |
| *G06F 8/65* | (2018.01) | |

(52) U.S. Cl.
CPC .............. *G06F 9/4406* (2013.01); *G06F 8/65* (2013.01); *G06F 9/5011* (2013.01)

(58) Field of Classification Search
CPC ............. G06F 11/1417; G06F 11/1438; G06F 11/1441; G06F 11/2284
USPC .......................................................... 714/36
See application file for complete search history.

(56) References Cited

U.S. PATENT DOCUMENTS

| | | | | |
|---|---|---|---|---|
| 10,691,618 B2* | 6/2020 | Xing | .................... | G06F 3/0622 |
| 10,691,837 B1* | 6/2020 | Martel | .................... | G06F 21/74 |
| 2005/0144443 A1* | 6/2005 | Cromer | ............... | G06F 11/1458 713/165 |
| 2008/0059799 A1* | 3/2008 | Scarlata | ................ | H04L 9/0897 713/176 |
| 2008/0133971 A1* | 6/2008 | Zhou | ..................... | G06F 11/079 714/32 |
| 2011/0126050 A1* | 5/2011 | Begole | ................... | G06Q 10/10 714/18 |

(Continued)

FOREIGN PATENT DOCUMENTS

| | | |
|---|---|---|
| CN | 101458743 A | 6/2009 |
| CN | 101983375 A | 3/2011 |
| CN | 101971182 B | 11/2013 |

*Primary Examiner* — Sarai E Butler
(74) *Attorney, Agent, or Firm* — Brokaw Patent Law PC; Christopher J. Brokaw

(57) ABSTRACT

Approaches for locally attesting an operational condition of a computer system during powering on the computer system. Prior to an operating system being loaded, an attestation client, executing on a computer system, analyzes a set of resources of the computer system to create measurement data. The attestation client provides the measurement data to an attestation server executing in a secure enclave on the computer system. The attestation server processes the measurement data and provides the processed measurement data to a remediation server. Upon the computer system being determined to be operationally healthy, the remediation server provides an unlock key to a locked persistent storage to permit the computer system to read the operating system stored on the persistent storage. Thereafter, a BIOS on the computer system may read the operating system and permit the same to be loaded on the computer system.

20 Claims, 3 Drawing Sheets

COMPUTER SYSTEM
100

(56) References Cited

U.S. PATENT DOCUMENTS

| | | | |
|---|---|---|---|
| 2012/0151020 A1* | 6/2012 | Bolay | G06F 8/65 709/221 |
| 2014/0040605 A1* | 2/2014 | Futral | G06F 21/572 713/2 |
| 2016/0180095 A1* | 6/2016 | Sarangdhar | G06F 21/575 713/2 |
| 2017/0091438 A1 | 3/2017 | Raziel | |
| 2017/0140146 A1* | 5/2017 | Mehta | G06F 21/6218 |
| 2017/0244698 A1 | 8/2017 | Gale | |
| 2017/0374055 A1 | 12/2017 | Smith | |
| 2018/0212971 A1* | 7/2018 | Costa | G06F 21/602 |
| 2018/0330093 A1* | 11/2018 | Shivanna | G06F 21/575 |
| 2019/0073478 A1* | 3/2019 | Khessib | G06F 9/4401 |
| 2019/0268318 A1* | 8/2019 | Tsirkin | H04L 9/3247 |

* cited by examiner

LOCAL OVERSIGHT AND PROVISIONING OF BIOS ACTIVITY

FIELD OF THE INVENTION

Embodiments of the invention relate to the promotion of a secure operating environment enabled by local monitoring and provisioning of BIOS activities.

BACKGROUND

When a computer is powered on, the computer undergoes an initial set of operations to configure the hardware and software of the computer. This process is known as the boot process. A Unified Extensible Firmware Interface (UEFI) standard has been developed by the Unified EFI Forum industry group to enhance the booting process of modern computer systems. However, not all problems in the boot process have been addressed by the UEFI standard and/or current techniques of the art.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for locally attesting an operational condition of a computer system during powering on the computer system are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Components of an Illustrative Device

Certain embodiments of the invention advantageously provide the user of a computer system with the peace of mind knowing that the computer system cannot execute an operating system if the computer system has been compromised in some fashion. As shall be explained in detail below, embodiments of the invention may employ a secure enclave, locally residing on a computer system, which may be used to locally monitor and attest the resources of a computer system. If the secure enclave judges the computer system to not be operationally healthy (as might be the case if malicious code is discovered on the computer system or an unauthorized change has been made to a resource of the computer system), then a variety of remedial actions may be performed, e.g., the computer system may be prevented from booting an operating system.

The secure enclave may be implemented by a variety of different mechanisms, but a common feature is that it is implemented by the hardware of the computer system and designed to prevent any data or code stored within from being modified in an unauthorized fashion. In this way, even if the operating system were to be reinstalled or if a hard-disk drive or flash drive were to be swapped on the computer system, the secure enclave would still be present in the hardware and operable to attest the health of the computer system and perform remedial actions, e.g., prevent the computer system from booting any operating system if the secure enclave judges the computer system to not be operationally healthy, or if the operating system has been compromised or is otherwise not approved by the secure enclave.

Figure 1:
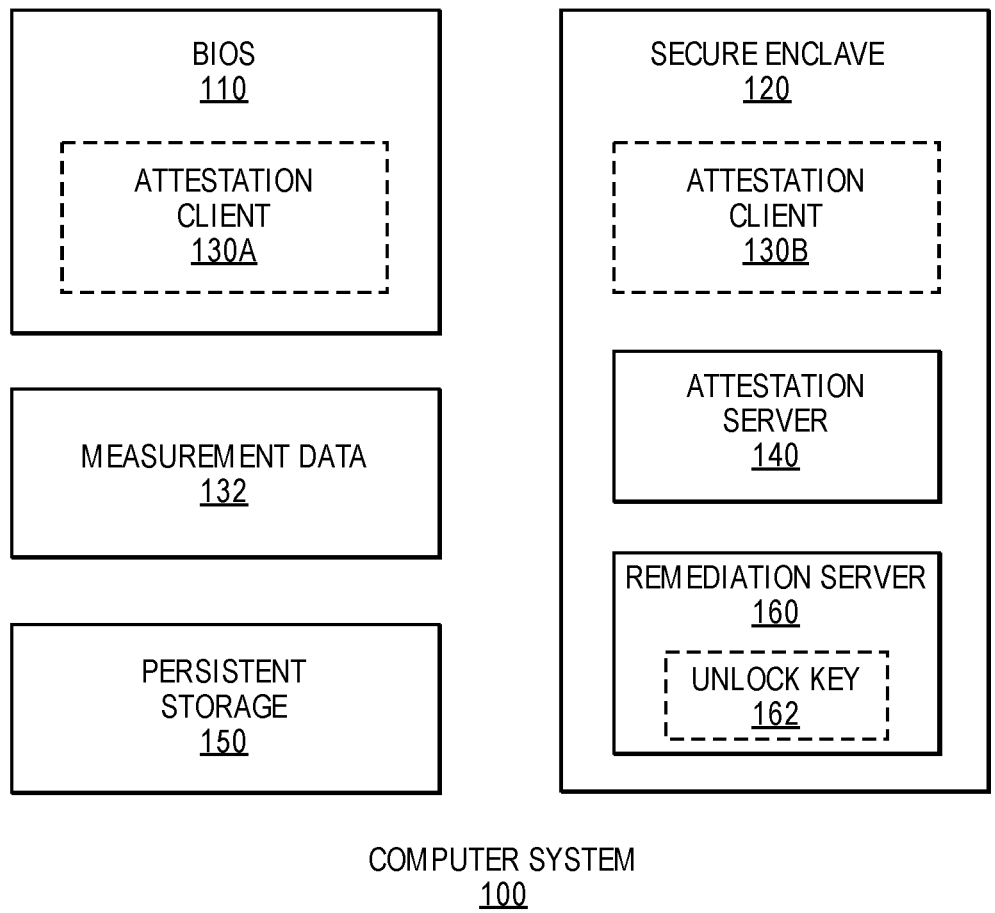
FIG. 1 is a block diagram of the functional components of an illustrative computer system according to an embodiment of the invention.

Before discussing in further detail how embodiments of the invention operate, it will be helpful to review FIG. 1, which is a block diagram of the functional components of an illustrative computer system 100 according to an embodiment of the invention. Computer system 100 may correspond to any computer system which is capable of executing basic input/output system (BIOS) 110 and secure enclave 120. Non-limiting, illustrative examples of computer system 100 include a personal computer (PC), a laptop, a tablet computer, a server, a router, a personal digital assistant (PDA), a cell phone, and a game system (such as an Xbox available from Microsoft Corporation of Redmond, Wash. or a PlayStation 3 available from Sony Corporation of Park Ridge, N.J.). Computer system 100 may, but need not, have access to a network, such as the Internet.

BIOS 110, as broadly used herein, refers to any basic input/output system (BIOS) that is designed to be the boot firmware for computer system 100 when computer system 100 is powered on. In an embodiment, BIOS 110 includes or corresponds to Unified Extensible Firmware Interface (UEFI) Platform Firmware.

In an embodiment, BIOS 110 may include attestation client 130A. An Attestation client is a functional component that is responsible for gathering measurement data 132, which is data that measures various operational aspects of computer system 100. An attestation client may store measurement data 132 so as to allow attestation server 140 to subsequently access measurement data 132 or may directly provide measurement data 132 to attestation server 140.

In certain embodiments, an attestation client may reside in BIOS 110, such as attestation client 130A shown in FIG. 1. In other embodiments, an attestation client may reside in secure enclave 120, such as attestation client 130B shown in FIG. 1. A computer system need only include a single instance of an attestation client 130 which executes either within BIOS 110 or secure enclave 120, although embodiments could implement an attestation client in both BIOS 110 and in secure enclave 120.

In embodiments of the invention implementing attestation client 130A within BIOS 110, attestation client 130A may reside in a root of trust of BIOS 110; by virtue of attestation client 130A being in a root of trust with BIOS 110, BIOS 110 trusts the execution of attestation client 130A without performing any security checks or validations. In an embodiment, attestation client 130A may be implemented as a driver of BIOS 110 or as the boot manager of BIOS 110.

Secure enclave 120, as broadly used herein, refers to any hardware mechanism which provides an environment allowing code executing therein to have full access to resources of the computer system in which the secure enclave resides, and yet resources of the computer system external to the secure enclave have no ability to read or write to resources maintained inside the secure enclave. Non-limiting, illustrative examples of secure enclave 120 include the Innovation Engine (IE) available from Intel Corporation of Santa Clara, Calif., and the ARM-based Platform Security Processor (PSP) available from AMD Inc. of Santa Clara, Calif. Secure enclave 120 may enable messages to be exchanged between processes executing outside of secure enclave 120 with processes executing inside of secure enclave 120.

An attestation client, such as attestation client 130A and/or 130B, may gather measurements of or information about various resources of computer system 100 as measurement data 132. For example, attestation client may gather information about a set of files, volatile memory, and/or data persistently stored on persistent storage 150. Measurement data 132 may be stored or expressed in a secure, encrypted manner that is resistant to tampering by unauthorized parties. Measurement data 132 may be stored within secure enclave 120, although not expressly depicted as so in the embodiment shown in FIG. 1. In certain embodiments, an attestation client may provide measurement data 132 directly to attestation server 140.

Persistent storage 150, as broadly used herein, refers to any mechanism for persistently storing digital data. Non-limiting, illustrative examples of persistent storage 150 include a hard-disk drive (HDD) and solid state memory, such as a flash drive.

Attestation Server 140 refers to a software entity, executing within secure enclave 120, which is responsible for analyzing measurement data 132 and providing the results of the analyzed measurement data 132 to remediation server 160.

Remediation Server 160 refers to a software entity, executing within secure enclave 120, which is responsible for determining whether computer system 100 is operationally healthy based on the results of the analyzed measurement data 132 provided to remediation server 160 by attestation server 140. Remediation server 160 may, as a result of reviewing the results of the analyzed measurement data 132, determine that one or more remedial actions should be performed on computer system 100. If remediation server 160 determines that computer system 100 is operationally healthy, then remediation server 160 may provide unlock key 162 to persistent storage 150 to cause persistent storage 150 to become unlocked, thereby facilitating access to any data stored thereon, such as but not limited to an operating system to be loaded by computer system 100.

Unlock key 162, as broadly used herein, refers to any data which is used or required to unlock persistent storage 150. A non-limiting, illustrative example of unlock key 162 is a password which is supplied to the controller of a hard-disk drive to unlock the hard-disk drive. In an embodiment, unlock key 162 may be stored in secure enclave 120 or another location, such as a Trusted Platform Module (TPM), which only secure enclave 120 can access. As a result, only software executing within secure enclave 120 may access unlock key 162, thereby protecting the privacy and integrity of unlock key from processes residing outside of secure enclave 120.

Having described the functional components of an illustrative computer system 100, additional description will now be given on the process for locally attesting an operational condition of a computer system during powering on the computer system according to certain embodiments.

Local Oversight and Provisioning of Bios Activity

Figure 2:
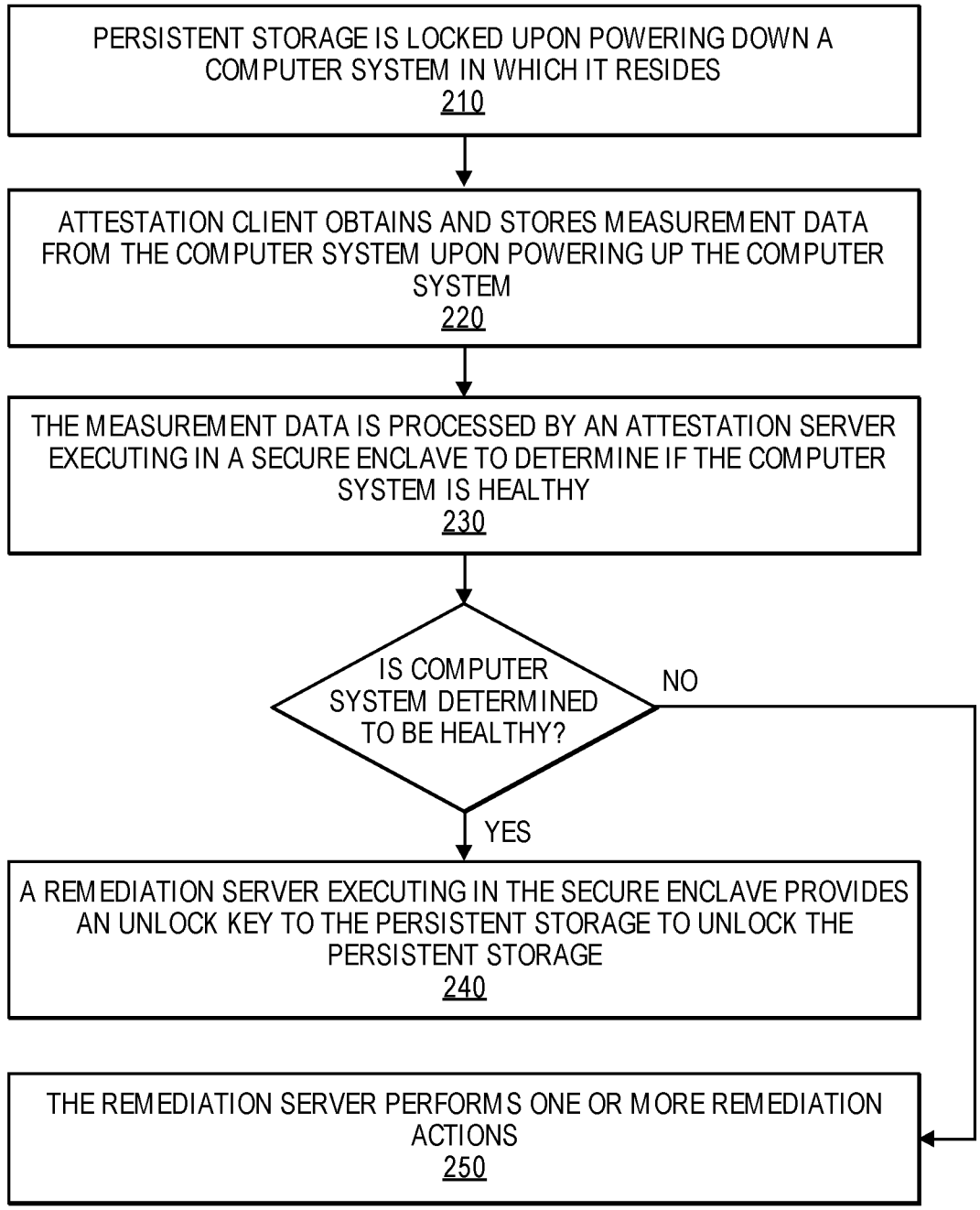
FIG. 2 is a flowchart describing the high-level steps of locally attesting an operational condition of a computer system during powering on the computer system according to embodiments of the invention.

FIG. 2 is a flowchart illustrating the steps of locally attesting an operational condition of a computer system during powering on the computer system according to an embodiment of the invention. The steps of FIG. 2 shall be described below with reference to computer system 100 of FIG. 1. In the description of below steps, the term 'attestation client 130' shall refer to or encompass attestation client 130A (i.e., an attestation client executing in BIOS 110), attestation client 130B (i.e., an attestation client executing in secure enclave 120), or two or more attestation clients operating as a functional unit to perform the actions attributed to a single attestation client herein (e.g., attestation client 130A and attestation client 130B may execute separately but cooperate and coordinate certain functions).

In step 210, upon powering down computer system 100, persistent storage 150 enters a locked state (i.e., becomes locked). Persistent storage 150 becomes locked either by virtue of its design on power loss (as is the case in hard-disk drive) or by virtue of software locking persistent storage 150. Persistent storage 150 may store any operating system executed by computer system 100. As a consequence of persistent storage 150 becoming locked upon powering down computer system 100, computer system 100 cannot boot to any operating system without persistent storage 150 becoming unlocked. In addition, data stored on persistent storage 150 cannot be accessed while persistent storage 150 is in a locked state. In this way, even if persistent storage 150 were to be removed from computer system 100, persistent storage 150 still could not be accessed without access to unlock key 162, which is required to transition persistent storage 150 from a locked state to an unlocked state.

A variety of different mechanisms may be used to lock and unlock persistent storage 150. For example, if persistent storage 150 is implemented using a hard-disk drive, then the hard-disk drive may be locked using a password which needs to be supplied to the controller of the hard-disk drive to unlock the hard-disk drive.

In step 220, attestation client 130 obtains and stores measurement data 132 from computer system 100 upon powering up computer system. In an embodiment, attestation client 130 may obtain measurement data 132 by gathering measurements of and/or information about resources of computer system 100, such as files, volatile memory, and/or data persistently stored on persistent storage 150.

The decision of which resources on computer system 100 to analyze in step 220 may be based upon a configuration of attestation client 130. The set of files analyzed by attestation client 130 in the generation of measurement data 132 may correspond to the set of files that compose or correspond to one or more of BIOS 110 and any operating system 120 of computer system 100, although the files that compose or correspond to additional software components may also be analyzed by attestation client 130 to produce measurement data 132. For example, the set of files analyzed by attestation client 130 to produce measurement data 132 may include or correspond to applications or security software, such as anti-virus software or a firewall residing on computer system 100. As another example, the set of files analyzed in step 210 may include files within a file system provided by an operation system of computer system 100.

In an embodiment, it is necessary to unlock persistent storage 150 prior to verifying that any executable data stored thereon, such as an operating system or application, does not contain malicious code or corresponds to a known state deemed safe or approved for execution. Therefore, to do so, persistent storage 150 may be provisionally unlocked, the additional attestation of the operating system and/or other executable code stored on persistent storage 150 may be performed, and then either computer system 100 may be permitted to boot (assuming attestation was successful) or if attestation was unsuccessful, additional remediation actions may be performed, e.g., one or more of the following actions may be performed: persistent storage 150 may be placed in a locked state, the user of computer system 100 may be informed, the operating system or other executable software stored on persistent storage 150 may be reinstalled from a known good image.

A purpose of analyzing the set of files in step 220 is to ensure that the files have not been either modified by any malicious parties or rendered outdated. Modification by malicious parties may involve either updating certain configuration settings of the software or the introduction of malicious code, such as a computer virus.

Analysis performed in step 220 may be accomplished using a set of analytics to ascertain the current state of each of the files being analyzed. Any analytics which may be used to determine whether a file is outdated or has been modified in an unauthorized manner may be employed by embodiments. For example, in an embodiment, attestation client 130 may employ a set of analytics for analyzing files in accordance with the Trusted Computing Group (TCG) standard. In doing so, attestation client 130 may set Trusted Platform Module (TPM) register values and create a TCG Event Log. Note that different types of BIOS components may be measured to different platform configuration registers (PCR)s. The specifics of the TCG Event Log and BIOS measurements are described in the "TCG EFI Platform Specification" by the Trusted Computing Group (TCG). As a result of attestation client 130 analyzing the set of files, attestation client 130 creates measurement data 132 that describes a current state of the set of files analyzed by attestation client 130. For example, measurement data 132 may identify which files in the set of files are outdated or have been modified in an unauthorized manner, although measurement data 132 may need to be interpreted in order to make the identification.

Embodiments of the invention may also determine whether unexpected or unauthorized hardware, such as a connected USB device or a PCIe device, has been connected to computer system 100. In such an embodiment, measurement data 132 will identify any unexpected and/or unauthorized hardware connected to computer system 100. Embodiments may also determine whether computer system 100 is missing any hardware components (such as the expected internal graphics card). In such an embodiment, measurement data 132 will identify any missing hardware that was expected to be connected to computer system 100.

Measurement data 132 may be expressed in a variety of different formats. In one embodiment, measurement data 132 conforms to a standard established by the Trusted Computing Group (TCG). In other embodiments, measurement data 132 may be implemented as digital signatures generated for each file analyzed.

In step 230, attestation server 140 processes measurement data 132 collected in step 220. The purpose of attestation server 140 processing measurement data 132 is to enable attestation server to determine if computer system 100 is deemed healthy.

If in step 230 attestation server 140 determines that computer system 100 is healthy, then in step 240 attestation server 140 informs remediation server 160 of this determination. In response, remediation server 160 causes persistent storage 150 to become unlocked by supplying unlock key 162 to persistent storage 150 to cause persistent storage to become unlocked, thereby allowing any operating system stored thereon to be loaded by BIOS 110.

On the other hand, if in step 230 attestation server 140 determines that computer system 100 is not healthy, then in step 250 attestation server 140 informs remediation server 160 of this determination. In response, remediation server 160 performs one or more remediation actions. Many different remediation actions may be performed by remediation server 160 based upon the results provided by attestation server 140; remediation server 160 may consult a set of policy data describing one or more policies to determine what remediation actions should be performed based upon the current operational status of computer system 100. Non-limiting, illustrative remediation actions include powering down computer system 100, locking computer system 100, and if a network connection is available to computer system, sending a message over the network to an IT administrator or other entity responsible for managing or overseeing computer system 100.

Remediation Actions Available to Remediation Server

In certain embodiments, in performing step 250, remediation server 160 may also consult policy data residing in secure enclave 120 to determine whether one or more additional security actions are to be performed.

In an embodiment, if remediation server 160 determines that one or more files in the resources of computer system 100 analyzed in step 220 have been tampered with (i.e., modified in an unauthorized manner) or otherwise corrupted, then remediation server 160 cause those files to be updated, repaired, or replaced prior to permitting an operating system to boot on computer system 100. To do so, in an embodiment, remediation server 160 may retrieve new versions of outdated files or replacement copies of tampered or corrupted files from a remote server over a network connect (if available). Once all files analyzed in step 220 are deemed up-to-date and authenticated, then remediation server 160 will permit computer system 100 to boot an operating system. Advantageously, remediation server 160 may update, repair, or replace any files deemed outdated, tampered with, or otherwise corrupted without human intervention, and so the software executing on computer system 100 is ensured to correspond to a clean copy of the most recent version without any manual effort on behalf of the user of computer system 100.

In another embodiment, remediation server 160 may determine whether to lock one or more persistent storages 150 of computer system 100 inoperable based on measurement data 132. Locking a persistent storage 150 of computer system 100 may be desirable if malicious code is determined to reside on that persistent storage 150. By locking persistent storage 150, further infection of computer system 100 (and by extension any network resource accessible by computer system 100 if a network is accessible to computer system 100) may be prevented, while preserving the contents of persistent storage 150 for subsequent analysis, which may be performed to identify the source of the infection and to develop a countermeasure. Thus, after persistent storage 150 has been unlocked, if additional analysis reveals that some portion of data stored therein is corrupted, then remediation server 160 may cause persistent storage 150 to transition back to a locked state to prevent computer system 100 from booting any operating system stored on persistent storage 150.

In another embodiment, remediation server 160 may determine whether to initialize persistent storage 150 if deemed corrupted by malicious code. Initializing persistent storage 150 may be desirable if malicious code is determined to reside on the persistent storage 150, or malicious hardware has been added to the system, and subsequent study of the infection is not desired. By initializing persistent storage 150, all data persistently stored on persistent storage 150 will be erased, thereby eliminating any threat to computer system 100 posed by malicious code residing on persistent storage 150 in a manner that allows computer system 100 to be used safely again. Initializing persistent storage 150 may be used by embodiments to ensure that any malware residing on persistent storage 150 is removed and unable to threaten the integrity of other system components. Initializing persistent storage 150 may be used by embodiments to securely erase or remove all data on persistent storage 150 to prevent unauthorized hardware or software from stealing or leaking secrets and sensitive data stored on persistent storage 150.

In another embodiment, remediation server 160 may determine whether to cause an audio or visual recording device (such as a video recorder or camera) to begin recording. If remediation server 160 and/or attestation server 140 determines that computer system 100 has been stolen or used improperly after analyzing measurement data 132, then remediation server 160 may instruct computer system 100 to cause an audio or visual recording device to record audio or video files to evidence how computer system 100 is currently being used and who is using computer system 100. Such audio and video files may be subsequently sent to an external server over a network, if available, for use in identifying any malicious activity associated with computer system 100.

In another embodiment, prior to loading any operating system on computer system 100, remediation server 160 may determine that a set of one or more files on computer system 100 does not satisfy a set of heuristics. As a consequence, remediation server 160 may cause an interface to be displayed by computer system 100. This interface allows a user to communicate with a support center to seek a remedy to the detected problem. The interface may be a text interface or a graphical user interface which allows the user to view information arranged in a manner to assist the user in resolving the problem, e.g., the information may be arranged in a FAQ (frequently asked questions) format or by allowing the user to interactively query answers to common problems stored in a database. Additionally, the user interface may allow the user to interact with a human operator. The human operator may help resolve the problem by authorizing remediation server 160 to provide to computer system 100 one or more files that satisfies the set of heuristics, thereby allowing computer system 100 to boot an operating system. The human operator may not authorize remediation server to proceed in this manner unless the use of computer system 100 authenticates him or herself to the satisfaction of the human operator working with the support center. The human operator may be in the employment of the owner of computer system 100 (for example, the human operator could be a member of the IT organization of a company) or a third-party (such as a company directed towards providing IT services to other companies).

In another embodiment, prior to loading any operating system on computer system 100, remediation server 160 may determine that a set of one or more files on device 100 does not satisfy a set of heuristics. As a consequence, remediation server 160 may update one or more configuration settings of BIOS 110 to a predefined setting before continuing a boot process in accordance with the predefined settings of BIOS 100. For example, a group or organization may decide, for security reasons, to prohibit any computerized device used by members of the group or organization from boot if a flash drive is affixed to a USB port. To that end, the group or organization may desire to prohibit any computerized device used by members of the group or organization unless all USB ports on the device are disabled. This policy may be described by policy data stored within secure enclave 120. Remediation server 160 may instruct BIOS 110 on certain policy changes to make in accordance with this policy. In this example, upon remediation server 160 determining that a file containing a file setting of BIOS 110 has been altered to enable one or more USB ports, remediation server 160 may instruct BIOS component 112 to update the configuration settings of BIOS 110 to disable all USB ports. In this way, embodiments of the invention may ensure that computer system 100 boots an operating system according to a predetermined set of environmental configuration settings. Note that the configuration setting updated in this fashion may be the configuration settings of BIOS 110, an operating system, or a software application.

Embodiments of the invention may also provide value to an Enterprise or organization by allowing them to prevent the use of computer systems belonging to them in certain situations identifiable from an analysis of measurement data 132. For example, if GPS coordinates identified by measurement data 132 indicate that computer system 100 has been moved outside of a physical area in which the device is intended to operate or if measurement data 132 indicates that computer system 100 has been flagged as "stolen," then embodiments may cause computer system 100 to be disabled in some fashion.

Implementing Mechanisms

Figure 3:
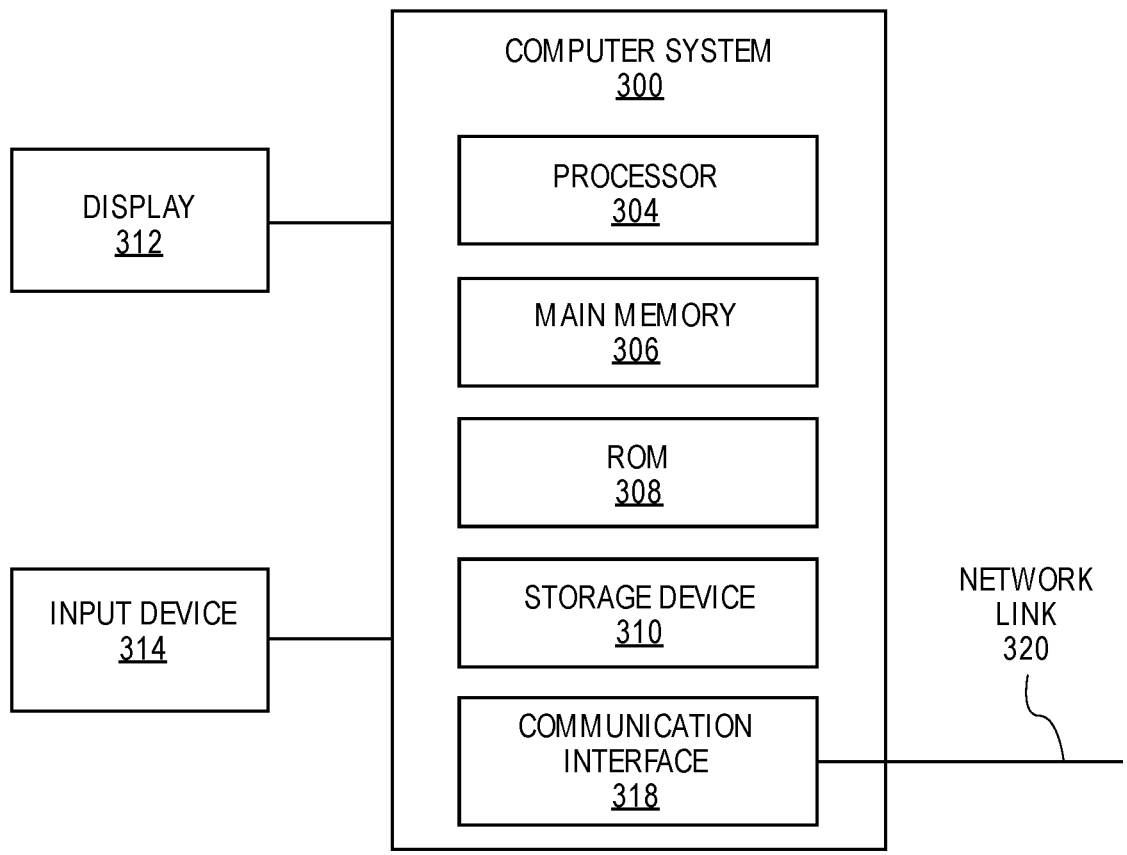
FIG. 3 is a block diagram that illustrates the hardware components of a computer system upon which an embodiment of the invention may be implemented.

FIG. 3 is a block diagram that illustrates a computer system 300 upon which an embodiment of the invention may be implemented. One of more of device 100, server 150, and proxy server 160 may be implemented on a computer system 300. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links, such as but not limited to a Bluetooth and/or 3G/4G connection, may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing one or more sequences of instructions for locally attesting an operational condition of a computer system during powering on the computer system, which when executed by one or more processors, cause:

prior to loading any operating system on the computer system, an attestation client, executing on the computer system, analyzing a set of resources residing on the computer system to create measurement data describing a current state of the set of resources, prior to loading any operating system on the computer system, the attestation client providing the measurement data to an attestation server executing in a secure enclave residing on the computer system;

the attestation server processing the received measurement data to determine if the computer system is operationally healthy;

upon the attestation server providing the processed measurement data to a remediation server and the computer system being deemed operationally healthy, the remediation server, executing in said secure enclave, providing an unlock key to a locked persistent storage to permit the computer system to read the operating system stored on the persistent storage; and the attestation server consulting policy data to determine whether to update a BIOS residing on the computer system to a newer version by replacing one or more files stored by the computer system with a set of updated files retrieved from a known healthy image.

2. The non-transitory machine-readable storage medium of claim 1, wherein the attestation client executes in the secure enclave of the computer system.

3. The non-transitory machine-readable storage medium of claim 1, wherein the known healthy image is retrieved from a remote location over a network.

4. The non-transitory machine-readable storage medium of claim 1, wherein execution of the one or more sequences of instructions further cause:

the remediation server consulting policy data to determine whether to render one or more persistent storage mediums of the computer system inoperable.

5. The non-transitory machine-readable storage medium of claim 1, wherein execution of the one or more sequences of instructions further cause:
the remediation server consulting policy data to determine whether to initialize a persistent storage deemed corrupted by malicious code.

6. The non-transitory machine-readable storage medium of claim 1, wherein execution of the one or more sequences of instructions further cause:
the remediation server consulting policy data to determine whether to cause an audio or visual recording device to begin recording.

7. The non-transitory machine-readable storage medium of claim 1, wherein execution of the one or more sequences of instructions further causes:
prior to loading any operating system on the computer system, upon the remediation server determining a set of one or more files on the computer system does not satisfy a set of heuristics, displaying an interface through which a user may communicate with a support center over a network to seek a remedy.

8. The non-transitory machine-readable storage medium of claim 1, wherein execution of the one or more sequences of instructions further causes:
prior to loading any operating system on the computer system, upon the remediation server determining a set of one or more files on the computer system does not satisfy a set of heuristics, updating one or more configuration settings of the BIOS to a predefined setting before continuing a boot process in accordance with the predefined settings of the BIOS.

9. The non-transitory machine-readable storage medium of claim 1, wherein the attestation client is a BIOS driver and in a root of trust of the BIOS.

10. The non-transitory machine-readable storage medium of claim 1, wherein said set of one or more resources includes a set of files, a set of volatile memory, and a set of blocks stored on a persistent storage.

11. A computer system configured to perform local attestation an operational condition of said computer system during powering on the computer system, comprising:
one or more processors; and
one or more computer-readable storage mediums storing one or more sequences of instructions, which when executed, cause:
prior to loading any operating system on the computer system, an attestation client, executing on the computer system, analyzing a set of resources residing on the computer system to create measurement data describing a current state of the set of resources,
prior to loading any operating system on the computer system, the attestation client providing the measurement data to an attestation server executing in a secure enclave residing on the computer system;
the attestation server processing the received measurement data to determine if the computer system is operationally healthy;
upon the attestation server providing the processed measurement data to a remediation server and the computer system being deemed operationally healthy, the remediation server, executing in said secure enclave, providing an unlock key to a locked persistent storage to permit the computer system to read the operating system stored on the persistent storage; and
the attestation server consulting policy data to determine whether to update a BIOS residing on the computer system to a newer version by replacing one or more files stored by the computer system with a set of updated files retrieved from a known healthy image.

12. The computer system of claim 11, wherein the attestation client executes in the secure enclave of the computer system.

13. The computer system of claim 11, wherein
the known healthy image is retrieved from a remote location over a network.

14. The computer system of claim 11, wherein execution of the one or more sequences of instructions further cause:
the remediation server consulting policy data to determine whether to render one or more persistent storage mediums of the computer system inoperable.

15. The computer system of claim 11, wherein execution of the one or more sequences of instructions further cause:
the remediation server consulting policy data to determine whether to initialize a persistent storage deemed corrupted by malicious code.

16. The computer system of claim 11, wherein execution of the one or more sequences of instructions further cause:
the remediation server consulting policy data to determine whether to cause an audio or visual recording device to begin recording.

17. The computer system of claim 11, wherein execution of the one or more sequences of instructions further causes:
prior to loading any operating system on the computer system, upon the remediation server determining a set of one or more files on the computer system does not satisfy a set of heuristics, displaying an interface through which a user may communicate with a support center over a network to seek a remedy.

18. The computer system of claim 11, wherein execution of the one or more sequences of instructions further causes:
prior to loading any operating system on the computer system, upon the remediation server determining a set of one or more files on the computer system does not satisfy a set of heuristics, updating one or more configuration settings of the BIOS to a predefined setting before continuing a boot process in accordance with the predefined settings of the BIOS.

19. The computer system of claim 11, wherein said set of one or more resources includes a set of files, a set of volatile memory, and a set of blocks stored on a persistent storage.

20. A method for locally attesting an operational condition of a computer system during powering on the computer system, comprising:
prior to loading any operating system on the computer system, an attestation client, executing on the computer system, analyzing a set of resources residing on the computer system to create measurement data describing a current state of the set of resources,
prior to loading any operating system on the computer system, the attestation client providing the measurement data to an attestation server executing in a secure enclave residing on the computer system;
the attestation server processing the received measurement data to determine if the computer system is operationally healthy;
upon the attestation server providing the processed measurement data to a remediation server and the computer system being deemed operationally healthy, the remediation server, executing in said secure enclave, providing an unlock key to a locked persistent storage to permit the computer system to read the operating system stored on the persistent storage; and the attestation server consulting policy data to determine whether to update a BIOS residing on the computer system to a newer version by replacing one or more files stored by the computer system with a set of updated files retrieved from a known healthy image.

* * * * *